Oct. 16, 1928.
H. W. BUNDY
1,687,605
APPARATUS FOR MAKING MULTIPLY STRIP STOCK
Filed Nov. 11, 1927
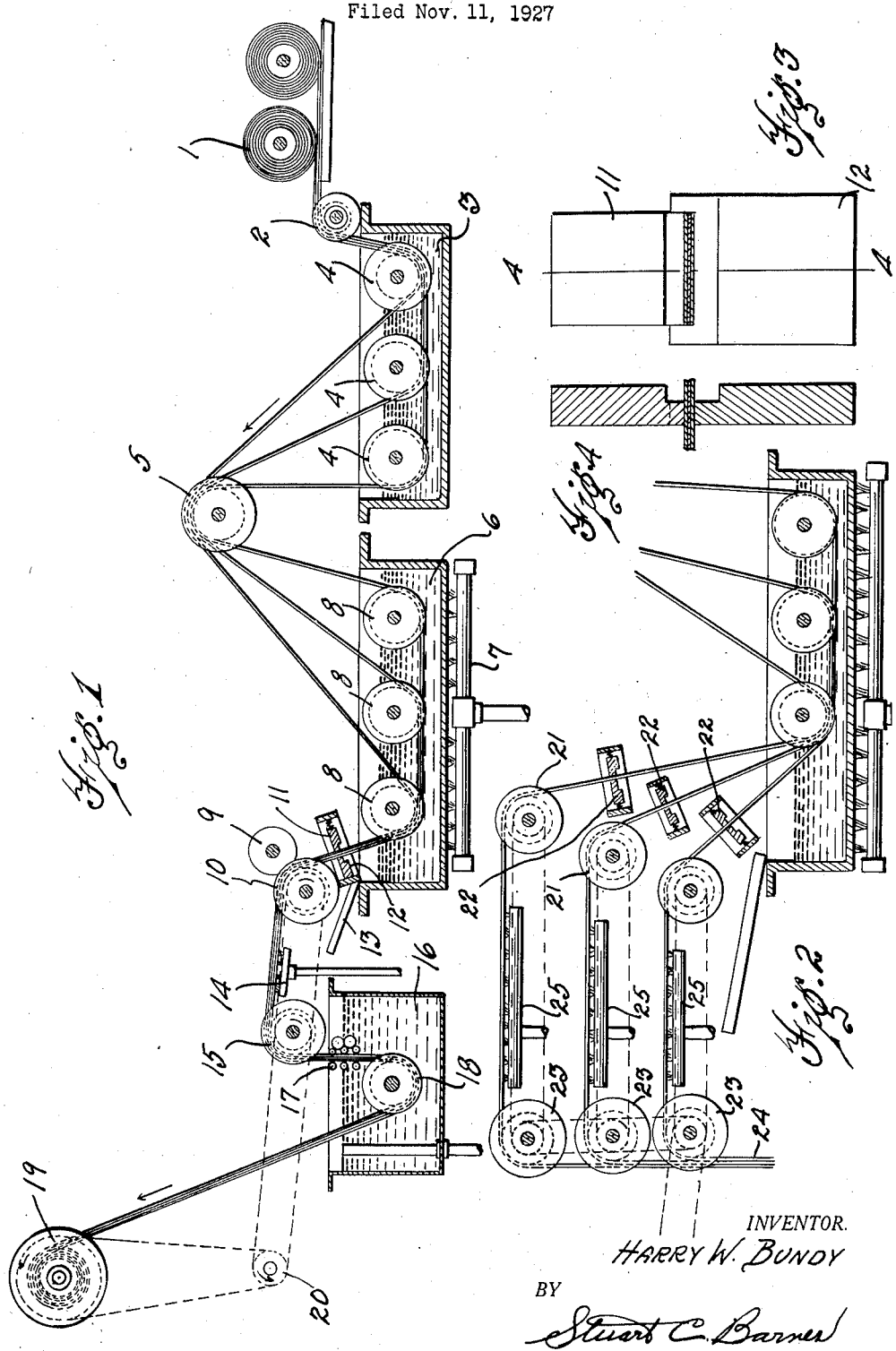
INVENTOR.
HARRY W. BUNDY
BY
Stuart C. Barnes
ATTORNEY.

Patented Oct. 16, 1928.

1,687,605

UNITED STATES PATENT OFFICE.

HARRY W. BUNDY, OF DETROIT, MICHIGAN.

APPARATUS FOR MAKING MULTIPLY STRIP STOCK.

Application filed November 11, 1927. Serial No. 232,576.

This invention relates to an apparatus for making multi-ply strip stock. Strip stock of this nature is advantageous for use in making various articles as, for example, tubes. Some tubes are used for conducting fluids and the like, and it is desirable to have the inside of the tube of non-corrodible metal. Such a tube may be made from multi-ply stock which consists of plies of different kinds of metal so that non-corrodible metal is on the inside of the tube. The other ply, or plies, of stock may be of cheaper metal, thus to reduce the cost of the finished tube: also, the other ply or plies may be of a metal such as steel for lending strength to the tube. Some tubes are used as supporting members or in places where the exterior is exposed to view, and in this case the non-corrodible metal may be on the outside. By using stock of three plies, both the inside and the outside of the tube may be of non-corrodible metal with the inner ply of a cheaper or strength-giving metal.

In the accompanying drawings:

Fig. 1 is a diagrammatic side view, partly in section, of a machine for making multi-ply stock;

Fig. 2 is a view showing a portion of the machine of a modified form;

Fig. 3 is a front elevation of wiper dies for the machine; and

Fig. 4 is a section taken on line 4—4 of Fig. 3.

Stock from which the multi-ply stock is made may be held in supply rolls 1, two of which are shown in Fig. 1. The stock is drawn from each of the supply rolls, in the present form three strips of stock being shown, and the separate strips are brought together and drawn over a roller 2 and into an acid bath 3. In this acid bath are three rollers 4, or one for each strip. Each strip leaves the acid bath from one of the rollers, and thus the strips are separated so that the acid is applied to all sides of each strip.

The three strips of stock may then be drawn over a roller 5 and thence into a solder bath 6, the solder being kept in a molten condition by a burner 7. The term "solder" as used here is meant to exemplify a fusing alloy, various forms or kinds of which may be used. There are rollers 8 in the solder bath, one for each strip, so that the strips enter the bath separately, in order that a coating of the molten solder is applied to all exterior portions of each strip.

The stock is then drawn through a set of wiper dies consisting of a die 11 and a die 12, which are arranged to wipe excess solder from both sides and both edges of the stock. These dies are preferably spring-pressed, as shown. The dies are shown in more detail in Figs. 3 and 4, and it will be noted that the die 12 is provided with a recess which has a width sufficient to permit passage of the stock therethrough and with the side walls wiping the edges of the stock. The die 11 fits within this recess, and the sides of the stock are wiped by reason of the dies being spring-pressed towards each other.

The stock, consisting of the three original strips of metal, may now be drawn in contact with each other, as shown, and through driven rollers 9 and 10. These rollers may be arranged to press the strips of stock together and squeeze out any excess molten solder between the strips, if there is any excess solder. A trough 13 may be positioned below the wiper dies and rollers to catch the excess of molten metal which is wiped off, and return the same into the bath.

Preferably, the several plies have not been subjected to the final sealing action, and of course when this action takes place the solder must be molten. In order to insure the solder being molten at this relatively remote point from the bath, a burner 14 is disposed below the stock. The stock is now passed over a roller 15 and then into a cooling water bath 16.

Just as the stock enters the cooling bath it is engaged between pressure rollers 17. Preferably, there is a set of these rollers, some of which are above the level of the water and some of which are immersed in the water. As the stock approaches the water the solder is molten and the several plies are pressed together by the first of the pressure rollers, and the plies are held pressed together for a distance below the surface of the water. Thus the several plies are tightly sealed together. The stock is next passed around a roller 18 and then wound on a spool 19. For driving the mechanism a suitable gear 20 driven by suitable means (not shown) may drive the rollers 10 and 15 by suitable chain connections, and the roller 9 may be geared to the roller 10. Also, the spool 19 may be driven by the same means.

A modified form of the apparatus is shown in Fig. 2. In this form there are three rollers 21 over which the three plies are drawn as they leave the solder bath. Also there are three sets of wiper dies 22, one for each ply for wiping off the excess solder, and three rollers 23 over which each ply is passed with the several plies being brought together, as at 24, from which point they pass through compression rollers and a cooling water bath, as shown in Fig. 1. For the purpose of keeping the solder in a molten condition on each ply, a burner 25 is positioned below each ply.

The machine may be one which operates with a continuous traveling movement of the plies of stock. It has been advantageous to show a machine adapted for making multi-ply stock having three plies, but it is within the invention to provide a machine for making stock with only two plies, or of more than three plies. The several plies may be of different kinds of metal, as above pointed out; for example, where three plies are used, the two outer plies may be of non-corrodible metal and the inner ply of a corrodible metal, but one which will lend strength to an article made from the multi-ply stock. When only two plies are used one may be of corrodible metal and the other of non-corrodible metal.

In the use of the apparatus the completed multi-ply stock can be wound upon a spool after the manner shown in Fig. 1. However, the winding of the stock upon the spool can be dispensed with and the completed multi-ply stock can be moved directly into an apparatus for making articles from the stock. An example of such an apparatus is a tube-forming machine which makes tubes from a strip of stock moving longitudinally with substantially continuous movement. In other words, the apparatus of the present invention can be placed adjacent the entrance end of the tube-forming machine so that the making of the multi-ply stock and the forming of the tube is substantially one continuous operation.

Claims:

1. An apparatus for making multi-ply metal stock, comprising in combination means for drawing a plurality of plies of metal stock from supplies thereof, a bath of molten sealing metal, means for guiding the plies through the bath while the plies are held separated, and means for bringing the plies together to be secured by the said sealing metal to form multi-ply metal stock.

2. An apparatus for making multi-ply metal stock, comprising in combination a bath of molten solder, a plurality of rollers therein, and means for drawing a plurality of plies of metal stock threaded over the rollers in separated relation, and means for bringing the plies together to be secured by the molten solder to form multi-ply metal stock.

3. An apparatus for making multi-ply metal stock, comprising in combination means for drawing a plurality of plies of metal with substantially continuous movement, means for applying solder to one or more of the plies, means for bringing the plies together, and a set of compression rollers through which the plies are passed which press the plies into tight engagement to be sealed together by the solder, and a bath of cooling fluid located in close proximity to the compression rollers through which the sealed-together plies are passed.

4. An apparatus for making multi-ply metal stock, comprising in combination means for drawing a plurality of plies of metal with substantially continuous movement, means for applying solder to one or more of the plies, means for bringing the plies together, and a set of compression rollers through which the plies are passed which press the plies into tight engagement to be sealed together by the solder, and a bath of cooling fluid through which the sealed-together plies are passed, some of said compression rollers being disposed outside of the cooling fluid and some of said compression rollers being disposed within the cooling fluid.

5. An apparatus for making multi-ply metal stock, comprising in combination means for drawing a plurality of plies of metal from supplies thereof, means for applying solder to one or more of the plies, means for bringing the plies together, means for maintaining the solder on the plies in a molten condition after the solder has been applied, said means being located so as to be effective on all the plies after they have been brought together, and means for compressing the plies together to be secured by the solder.

6. An apparatus for making multi-ply metal stock, comprising in combination rollers over which the plies of metal are placed, an acid pot and a solder pot in which some of the rollers are placed, there being one roller for each ply, means for drawing the plies longitudinally with substantially continuous movement over the rollers to apply solder to the plies, means for removing the excess solder on the plies, means for maintaining the solder on the moving plies in a molten condition, means for bringing the plies together in abutting relation, and compression means through which the plies are passed to be sealed by the solder and form multi-ply stock.

In testimony whereof I affix my signature
HARRY W. BUNDY.